United States Patent

Isobe et al.

[19]

[11] Patent Number: 6,038,912

[45] Date of Patent: Mar. 21, 2000

[54] FAILURE DETECTION SYSTEM OF PRESSURE SENSOR

[75] Inventors: Takashi Isobe; Kojiro Tsutsumi, both of Saitama, Japan

[73] Assignee: Honda Giken Kogyo Kabushiki Kaisha, Tokyo, Japan

[21] Appl. No.: 09/304,988

[22] Filed: May 4, 1999

[30] Foreign Application Priority Data

May 14, 1998 [JP] Japan ................................. 10-148265

[51] Int. Cl.$^7$ ........................... G01L 27/00; G01M 19/00
[52] U.S. Cl. ........................ 73/1.59; 73/1.66; 73/118.1; 73/49.7
[58] Field of Search ..................... 73/1.57, 1.59, 73/1.61, 1.62, 1.66, 118.1, 49.7

[56] References Cited

U.S. PATENT DOCUMENTS 4,744,244  5/1988  Tanaka ....................................... 73/1.62
5,469,735  11/1995  Watanabe ................................ 73/118.1
5,750,888  5/1998  Matsumoto et al. .................... 73/118.1
5,945,596  4/1997  Burkel et al. ............................ 73/49.7

FOREIGN PATENT DOCUMENTS 408246941A  9/1996  Japan ............................... F02D 45/00
409032659A  2/1997  Japan ............................... F02M 25/08

Primary Examiner—Hezron Williams
Assistant Examiner—Chad Soliz
Attorney, Agent, or Firm—Sughrue, Mion, Zinn, Macpeak & Seas, PLLC

[57] ABSTRACT

A determination as to whether or not the absolute value PCHK of the deviation between a detection value PTANK of a pressure sensor and its average value PTANKAVE exceeds a predetermined pressure DLEAKCHK is repeated within a predetermined time TINTVAL. The number of times the absolute value PCHK has exceeded the predetermined pressure DLEAKCHK is measured on a failure determination counter C91BNG. When the value of the counter C91BNG exceeds a determination threshold value 91BJVD, it is determined that the pressure sensor fails (time t10).

3 Claims, 4 Drawing Sheets

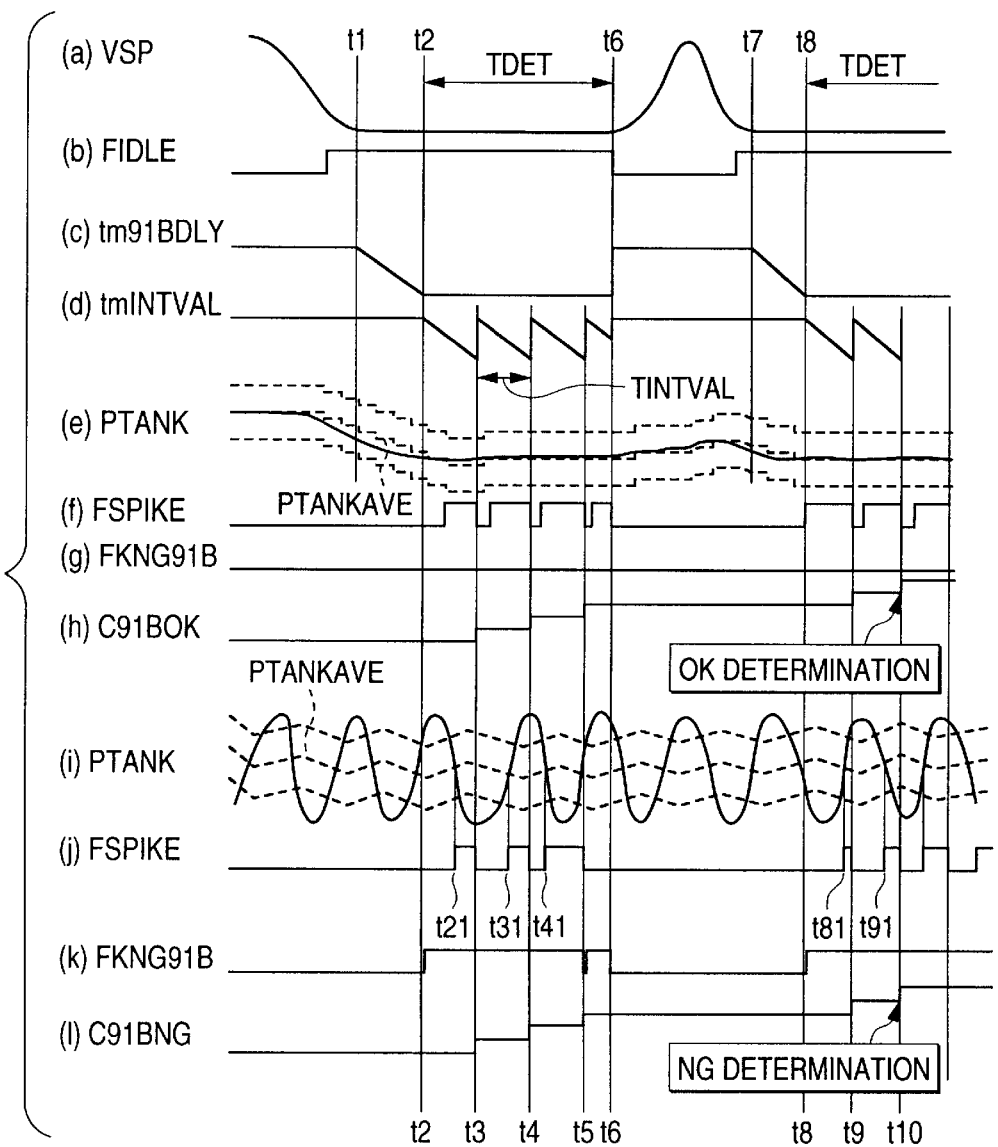
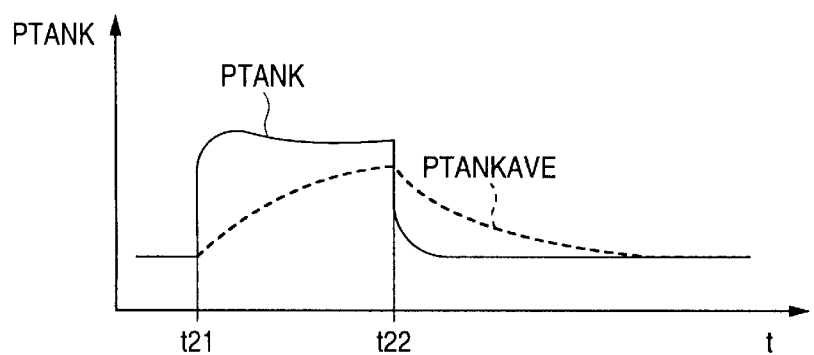

FAILURE DETECTION SYSTEM OF PRESSURE SENSOR

BACKGROUND OF THE INVENTION

1. Field of the Invention

This invention relates to a failure detection system of a pressure sensor for detecting pressure in a fuel tank or a passage connected to a fuel tank.

2. Description of the Related Art

An evaporation fuel processing unit for storing evaporation fuel occurring in a fuel tank in a canister and supplying an inlet system of an internal combustion engine at the appropriate time is widely used. If leakage occurs in the evaporation fuel processing unit, evaporation fuel is released into the atmosphere. Thus, a pressure sensor is provided for detecting pressure in the evaporation fuel processing unit and leakage occurring in the fuel tank or the canister is detected according to a detection value of the pressure sensor.

If the pressure sensor itself fails, accurate leakage detection cannot be executed. Therefore, a technique has been known such that the pressure sensor is determined to fail, when the detection value of a pressure sensor becomes a value outside a predetermined range of upper and lower limit values (for example, range of atmospheric pressure ±45 mmHg) just after cold start of an engine and the state continues for a predetermined time.

However, such a technique cannot detect a failure occurred in a state where a pressure sensor output varies continuously for some reason, for example, a failure such that output waveform as indicated by the solid line in (i) of FIG. 4 is produced. Therefore, leakage cannot be detected accurately in a state where such a failure occurs.

SUMMARY OF THE INVENTION

It is therefore an object of the invention to provide a pressure sensor failure detection system that can also detect a failure such that a detection value varies continuously.

To the end, according to one of embodiments of the invention, there is provided a failure detection system of a pressure sensor for detecting pressure in an evaporation fuel processing unit for processing evaporation fuel occurring in a fuel tank, the failure detection system comprising average value calculation means for calculating an average value of detection values of the pressure sensor and failure detection means for repeatedly executing a deviation determination as to whether or not the deviation between the detection value and the average value is greater than a predetermined value, when the number of times the deviation has been determined to be greater than the predetermined value exceeds a predetermined number of times, the failure detection means for detecting a failure of the pressure sensor.

The "predetermined value" is a value at a degree that the minimum variation wherein leakage detection with the pressure sensor cannot be executed accurately can be detected, and the "predetermined number of times" is determined experimentally using the pressure sensor in which a failure wherein output varies continuously occurred actually.

According to the configuration, a deviation determination as to whether or not the deviation between the detection value and the average value is greater than the predetermined value is executed repeatedly. When the number of times the deviation has been determined to be greater than the predetermined value exceeds the predetermined number of times, a failure of the pressure sensor is detected. Therefore, even in a failure such that pressure sensor output varies continuously, it is often determined that the deviation is greater than the predetermined value, so that it is made possible to detect such a failure.

In another embodiment of the invention, in the failure detection system, the failure detection means executes the deviation determination on condition that the larger-than, equal-to, less-than relation between the detection value and the average value is reversed within a predetermined time.

The "predetermined time" is a time at a degree that the minimum variation wherein leakage detection with the pressure sensor cannot be executed accurately can be detected, for example, about three seconds.

According to the configuration, the deviation determination is executed on condition that the larger-than, equal-to, less-than relation between the detection value of the pressure sensor and the average value is reversed within the predetermined time. When a state in which the detection value is greater than its average value continues as at the refueling time, etc., the pressure sensor may be erroneously determined to fail although it is normal. This erroneous determination can be prevented.

In another embodiment of the invention, in the failure detection system, the failure detection means does not execute the deviation determination while the vehicle in which the fuel tank is installed runs.

According to the configuration, the deviation determination is not executed while the vehicle in which the fuel tank is installed runs. As the vehicle runs, fuel in the fuel tank shakes, pressure sensor output varies, and the pressure sensor may be erroneously determined to fail although it is normal. This erroneous determination can be prevented.

BRIEF DESCRIPTION OF THE DRAWINGS

FIG. 4 is a timing chart to describe the failure detection processing in FIGS. 2 and 3; and FIG. 5 is a timing chart to show the progress of the detection value of the pressure sensor and its average value at the refueling time.

DESCRIPTION OF THE PREFERRED EMBODIMENTS

Referring now to the accompanying drawings, there is shown a preferred embodiment of the invention.

Figure 1:
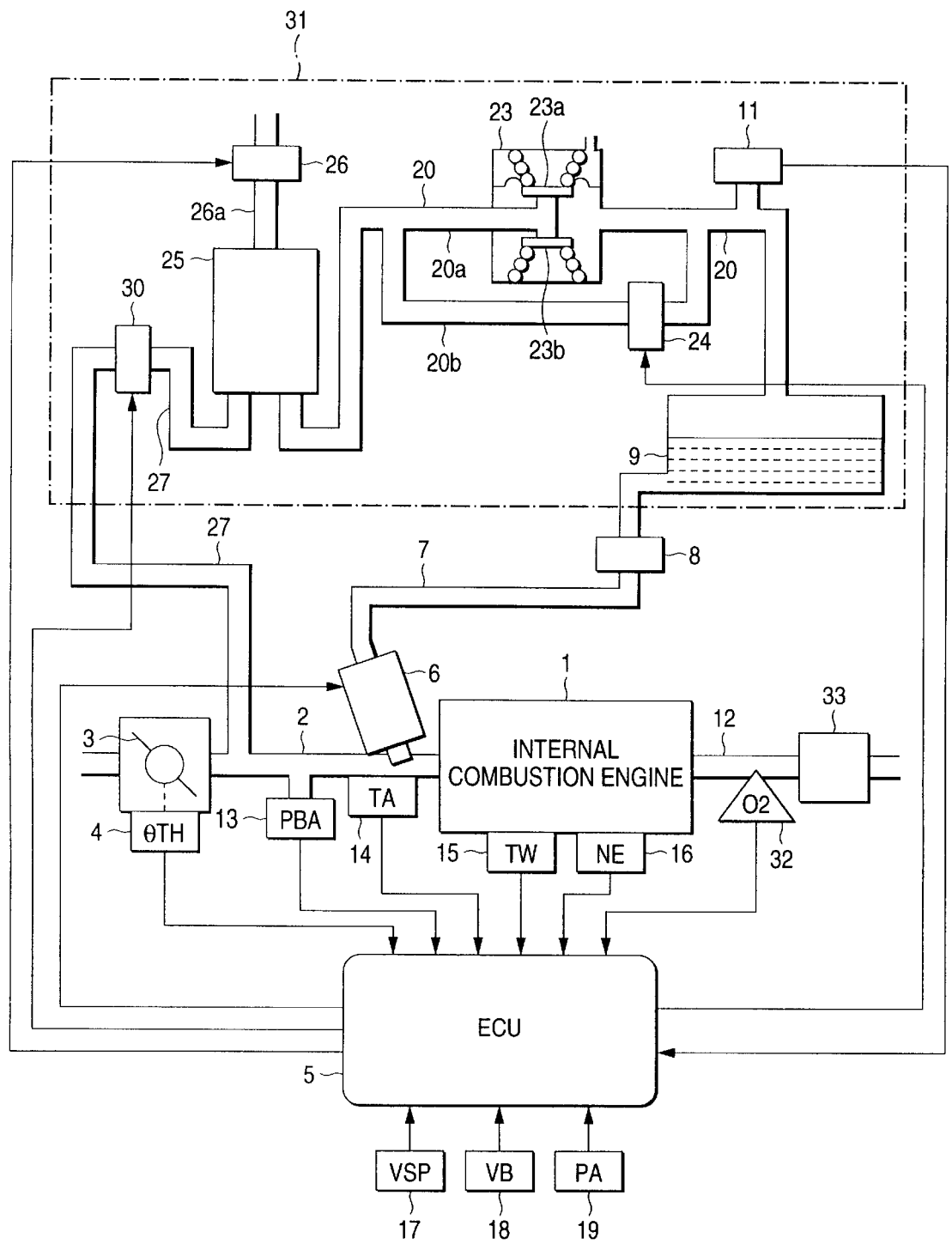
FIG. 1 is a diagram to show the configuration of an internal combustion engine, an evaporation fuel processing unit, and a controller for controlling them according to one embodiment of the invention.

FIG. 1 is a diagram to show the whole configuration of an internal combustion engine, an evaporation fuel processing unit, and a controller for controlling them according to one embodiment of the invention. In the figure, numeral 1 denotes an internal combustion engine having four cylinders, for example, (simply, engine), and a throttle valve 3 is disposed at an intermediate point of an inlet pipe 2 of the engine 1. A throttle valve opening (θTH) sensor 4 is coupled to the throttle valve 3 and outputs an electric signal responsive to the opening of the throttle valve 3 to an electronic control unit (ECU) 5.

A fuel injection valve 6 is provided for each cylinder at an intermediate point of the inlet pipe 2 slightly upstream from an inlet valve (not shown) between the engine 1 and the throttle valve 3. Each fuel injection valve 6 is connected via a fuel supply pipe 7 to a fuel tank 9 and a fuel pump 8 is placed at an intermediate point of the fuel supply pipe 7. The fuel injection valve 6 is electrically connected to the ECU 5 and the valve opening time of the fuel injection valve 6 is controlled according to a signal from the ECU 5.

An intra-inlet-pipe absolute pressure (PBA) sensor 13 for detecting intra-inlet-pipe absolute pressure PBA and an inlet gas temperature (TA) sensor 14 for detecting inlet gas temperature TA are placed downstream from the throttle valve 3 of the inlet pipe 2, and detection signals of these sensors are supplied to the ECU 5.

An engine water temperature (TW) sensor 15 made up of a thermistor, etc., is fitted into a cylinder peripheral wall filled with cooling water of a cylinder block of the engine 1. The engine cooling water temperature detected by the TW sensor 15, which will be hereinafter referred to as "engine water temperature TW," is converted into an electric signal and this electric signal is supplied to the ECU 5.

A number-of-revolutions-of-engine (NE) sensor 16 is attached in the surroundings of a cam shaft (not shown) or a crank shaft (not shown) of the engine 1. The NE sensor 16 outputs a signal pulse (TDC signal pulse) to the ECU 5 at a predetermined crank angle position each time the crank shaft of the engine 1 rotates 180 degrees.

An O2 sensor 32 as an exhaust concentration sensor is placed at an intermediate point of an exhaust pipe 12. It detects an oxygen concentration in exhaust gas and outputs a signal responsive to an oxygen concentration detection value VO2 to the ECU 5. A three way catalyst 33 of an exhaust emission control device is disposed downstream from the O2 sensor 32 of the exhaust pipe 12.

A vehicle speed sensor 17 for detecting running speed VSP of a vehicle in which the engine 1 is installed, a battery voltage sensor 18 for detecting battery voltage VB, and an atmospheric pressure sensor 19 for detecting atmospheric pressure PA are connected to the ECU 5 and detection signals of these sensors are supplied to the ECU 5.

Next, an evaporation fuel processing unit made up of the fuel tank 9, a charge passage 20, a canister 25, a purge passage 27, etc., will be discussed.

The fuel tank 9 is connected to the canister 25 via the charge passage 20, which has first and second branch parts 20a and 20b placed in an engine room of the vehicle. A pressure sensor 11 for detecting pressure PTANK in the charge passage 20 (the pressure is almost equal to pressure in the fuel tank 9 in a stationary state) is attached to the charge passage 20 between the branch parts 20a and 20b and the fuel tank 9, and a detection signal of the sensor is supplied to the ECU 5. Hereinafter, output of the pressure sensor 11 will be referred to as "detection value PATNK."

A two-way valve 23 is provided in the first branch part 20a. It has a mechanical valve made up of a positive pressure valve 23a which is opened when the intra-tank pressure PTANK becomes higher than the atmospheric pressure about 20 mmHg and a negative pressure valve 23b which is opened and actuated when the intra-tank pressure PTANK becomes lower than pressure on the canister 25 side of the two-way valve 23 by a predetermined pressure.

A bypass valve 24 is placed in the second branch part 20b. It is an electromagnetic valve which is normally closed and is opened and closed during execution of tank monitor processing described later, and actuation of the bypass valve is controlled by the ECU 5.

The canister 25 contains activated carbon for absorbing evaporation fuel and has an inlet port communicating with the atmosphere via a passage 26a. A vent shut valve 26 is disposed at an intermediate point of the passage 26a. It is an electromagnetic value which is normally held open and is closed in a predetermined actuation state, and actuation of the vent shut valve is controlled by the ECU 5.

The canister 25 is connected to the downstream side of the throttle valve 3 of the inlet pipe 2 via the purge passage 27 and a purge control valve 30 is placed on the purge passage 27. The purge control valve 30 is an electromagnetic value adapted to be able to continuously control the flow quantity by changing the on-off duty ratio of a control signal of the purge control valve, and actuation of the purge control valve is controlled by the ECU 5.

The ECU 5 comprises an input circuit having functions of shaping the input signal waveform from each of the above-mentioned sensors, correcting the voltage level to a predetermined level, and converting an analog signal value into a digital signal value, a central processing unit (CPU), a storage circuit for storing operation programs executed by the CPU, the operation results, and the like, and an output circuit for supplying drive signals to the fuel injection valve 6, the bypass valve 24, and the purge control valve 30.

The CPU of the ECU 5 opens and closes the bypass valve 24, the vent shut valve 26, and the purge control valve 30 when a predetermined condition is satisfied and executes abnormality determination processing of determining whether or not leakage occurs in the evaporation fuel processing unit based on the intra-tank pressure PTANK detected by the pressure sensor 11. It also executes failure detection processing of the pressure sensor 11 shown in FIGS. 2 and 3.

Figure 2:
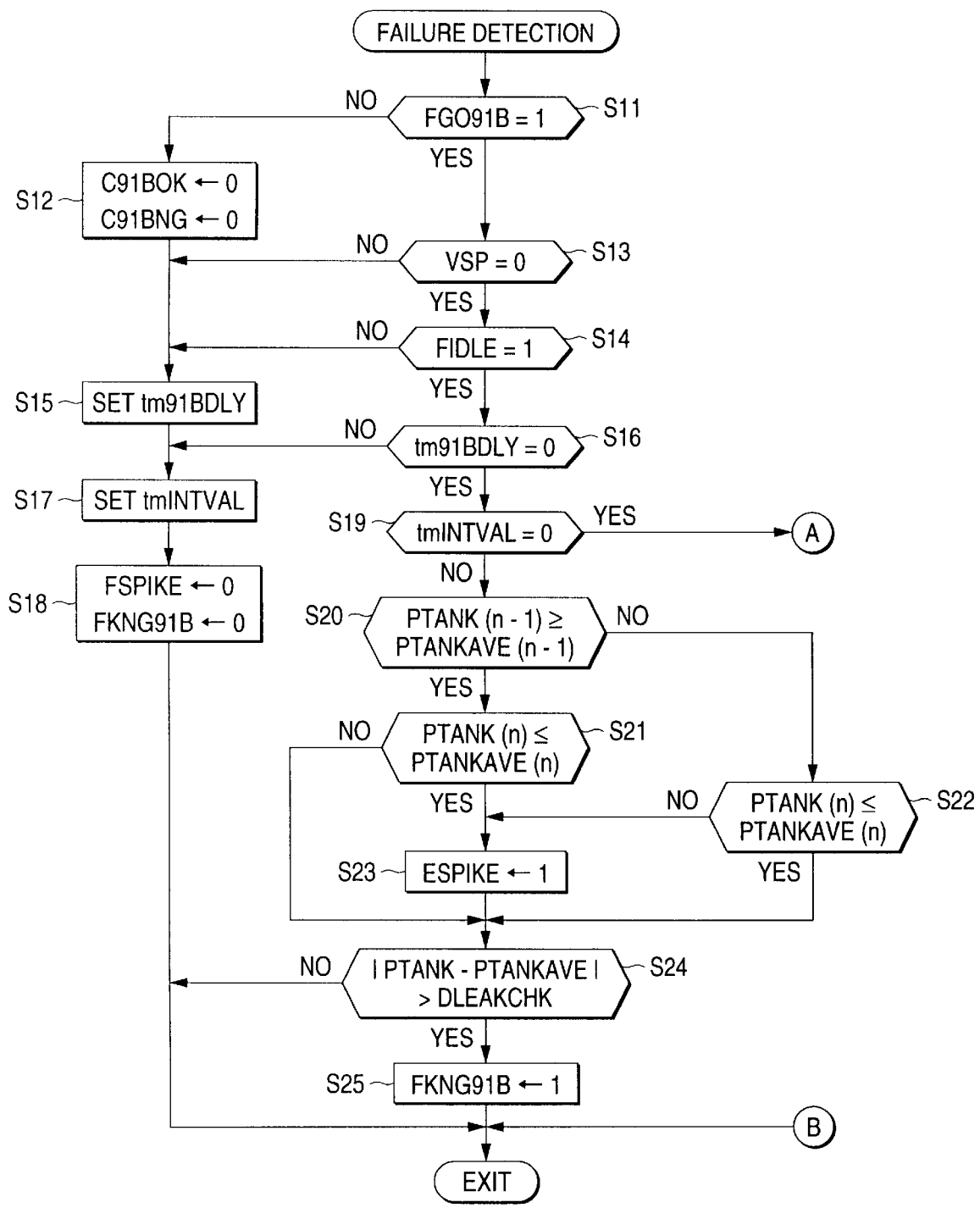
FIG. 2 is a flowchart of failure detection processing of pressure sensor (No. 1)
Figure 3:
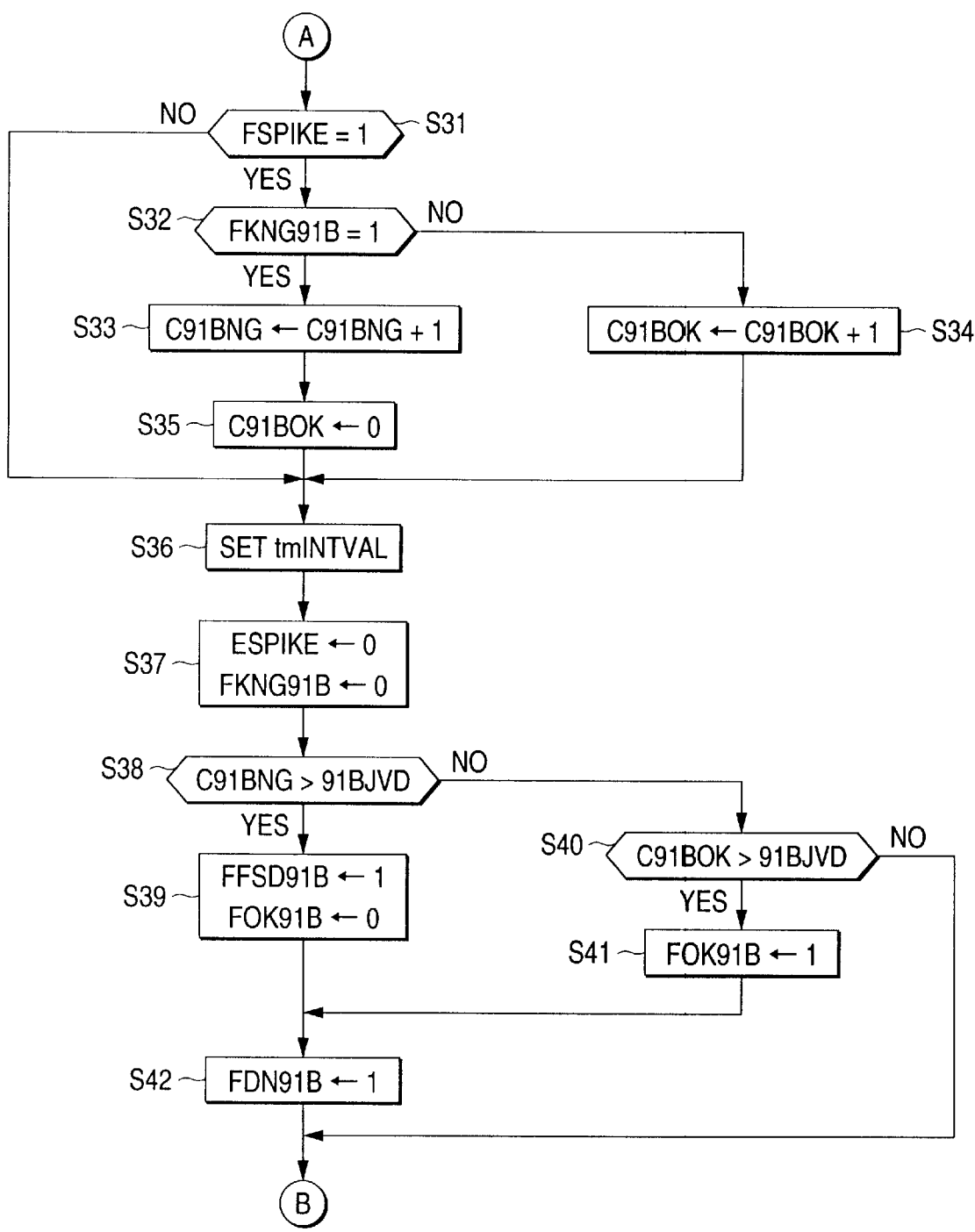
FIG. 3 is a flowchart of failure detection processing of pressure sensor (No. 2)

The failure detection processing in FIGS. 2 and 3 is executed by the CPU of the ECU 5 every given time (for example, every 80 msec).

First, at step S11, whether or not an enable flag FGO91B for indicating that execution of failure detection is enabled when the flag is "1" is "1" is determined. The enable flag FGO91B is set to "1" if the engine is started in a state in which the amount of evaporation, fuel occurring in the fuel tank is small and the engine water temperature TW is lower than temperature at a degree that the temperature does not affect failure determination (for example, 35° C.). That is, failure detection of the pressure sensor 11 is executed just after cold start of the engine 1.

If FGO91B is "0" and execution of failure detection is not enabled at step S11, a normality determination counter C91BOK used for determining whether or not the pressure sensor 11 is normal and a failure determination counter C91BNG used for determining whether or not the pressure sensor 11 fails are both reset to "0" at step S12, a predetermined delay time T91BDLY (for example, about five to 10 seconds) is set in a delay timer tm91BDLY and the delay timer is started at step S15, and a predetermined time TINTVAL (for example, three seconds) is set in an interval timer tmINTVAL and the interval timer is started at step S17.

The delay timer tm91BDLY is a down-count timer for delaying execution of determination processing at step S19 and later (described later) for the predetermined delay time. The interval timer tmINTVAL is a down-count timer for measuring the execution periods of update processing of the count of the normality determination counter C91BOK or the failure determination counter C91BNG (steps S31 to S35) and determination processing based on the count (steps S38 to S41).

The predetermined delay time T91BDLY is equivalent to the time required by the time shaking of fuel in the fuel tank settles into a stable state after the vehicle stops, and is set to about five to 10 seconds, for example. The predetermined time TINTVAL is set to a time at a degree that the minimum variation wherein leakage detection with the pressure sensor 11 cannot be executed accurately can be detected, for example, about three seconds.

Next, a reversal flag FSPIKE and an NG flag FKNG91B are both set to "0" at step S18 and the processing is terminated.

The reversal flag FSPIKE is a flag indicating, when the flag is "1," that the larger-than, equal-to, less-than relation between detection value PTANK and its average value PTANKAVE is reversed by executing steps S20 to S23 described later. The NG flag FKNG91B is a flag set to "1" if the absolute value of the deviation between the detection value PTANK and its average value PTANKAVE, PCHK (=|PTANK−PTANKAVE|), is greater than a predetermined pressure DLEAKCHK by executing steps S24 and S25 described later.

On the other hand, if FGO91B is 1 and execution of failure detection is enabled at step S11, whether or not the vehicle speed VSP is 0 is determined at step S13. If VSP is 0 and the vehicle stops, whether or not an idle flag FIDLE indicating that the engine 1 is in an idle state when the flag is "1" is "1" is determined at step S14. If VSP is greater than 0 or if FIDLE is 0 and the engine 1 is in any other running state than idle, control goes to step S15. If the engine 1 is in an idle state, control goes to step S16 at which whether or not the value of the delay timer tm91BDLY is "0" is determined. At the beginning, tm91BDLY is greater than 0, thus control goes to step S17. When the predetermined delay time T91BDLY has elapsed, whether or not the value of the interval timer tmINTVAL is "0" is determined at step S17.

At the beginning, tmINTVAL is greater than 0, control goes to step S20 and whether or not the previous value PTANK(n−1) of the detection value PTANK (the "previous value" is the value at the previous execution time of the processing) is equal to or greater than the previous value PTANKAVE(n−1) of the average value PTANKAVE is determined. At step S21 or S22, whether or not the current value PTANK(n) of the detection value PTANK is equal to or less than the current value PTANKAVE(n) of the average value PTANKAVE is determined. The (n) is a suffix to mean that the value is the current value; normally, it is omitted. The average value PTANKAVE is calculated by the CPU of the ECU 5 according to the following expression (1):

$$PTANKAVE(n) = \alpha \times PTANK(n) + (1-\alpha) \times PTANKAVE(n-1) \quad (1)$$

where $\alpha$ is a smoothing coefficient set to a value ranging from 0 to 1.

If PTANK(n−1)≧PTANKAVE(n−1) and PTANK(n)≦PTANKAVE(n) or if PTANK(n−1)<PTANKAVE(n−1) and PTANK(n)>PTANKAVE(n) as the determination result of steps S20 to S22, namely, if the larger-than, equal-to, less-than relation between the detection value PTANK and the average value PTANKAVE is reversed, the reversal flag FSPIKE is set to "1" at step S23 and control goes to step S24. On the other hand, if PTANK(n−1)≧PTANKAVE(n−1) and PTANK(n)>PTANKAVE(n) or if PTANK(n−1)<PTANKAVE(n−1) and PTANK(n)<PTANKAVE(n), namely, if the larger-than, equal-to, less-than relation between the detection value PTANK and the average value PTANKAVE is not reversed, immediately control goes to step S24.

At step S24, whether or not the absolute value PCHK of the deviation between the detection value PTANK and the average value PTANKAVE is greater than the predetermined value DLEAKCHK is determined. If |PTANK−PTANKAVE|≦DLEAKCHK, immediately the processing is terminated. If |PTANK−PTANKAVE|>DLEAKCHK, the NG flag FKNG91B is set to "1" at step S25 and the processing is terminated.

The predetermined value DLEAKCHK is set to a value at a degree that the minimum variation wherein leakage detection with the pressure sensor 11 cannot be executed accurately can be detected, for example, about 2 mmHg.

On the other hand, if tmINTVAL becomes 0 at step S19, control goes to step S31 and whether or not the reversal flag FSPIKE is "1" is determined. If FSPIKE is 0 and the larger-than, equal-to, less-than relation between the detection value PTANK and the average value PTANKAVE is not reversed during the predetermined time TINTVAL, immediately control goes to step S36. If FSPIKE is 1 and the larger-than, equal-to, less-than relation is reversed, whether or not the NG flag FKNG91B is "1" is determined at step S32. If FKNG91B is "1," the failure determination counter C91BNG is incremented by one at step S33 and the value of the normality determination counter C91BOK is reset to "0." If FKNG91B is "0," the normality determination counter C91BOK is incremented by one at step S34 and control goes to step S36.

At step S36, the predetermined time TINTVAL is set in the interval timer tmINTVAL and the interval timer is started. Next, the reversal flag FSPIKE and the NG flag FKNG91B are both set to "0" at step S37.

At step S38, whether or not the value of the failure determination counter C91BNG is greater than a determination threshold value 91BJVD (for example, four) is determined. If C91BNG≦91BJVD, whether or not the value of the normality determination counter C91BOK is greater than the determination threshold value 91BJVD is determined at step S40. If NO is returned from both steps S38 and S40, neither normality determination nor failure determination is executed and immediately the processing is terminated.

If C91BNG becomes greater than 91BJVD at step S38, it is determined that the pressure sensor 11 fails and the failure flag FFSD91B indicating that the pressure sensor 11 fails when the flag is "1" is set to "1" and the normality flag FOK91B indicating that the pressure sensor 11 is normal when the flag is "1" is set to "0" at step S39. Further, an end flag FDN91B, which indicates that the failure or normality determination terminates with the flag "1" is set to "1" at step S42 and the processing is terminated.

If C91BOK becomes greater than 91BJVD at step S40, it is determined that the pressure sensor 11 is normal and the normality flag FOK91B is set to "1" and control goes to step S42.

FIG. 4 is a timing chart to describe the failure detection processing in FIGS. 2 and 3. In FIGS. 4, (e), (f), (g), and (h) correspond to the case where the pressure sensor 11 is normal, and (i), (j), (k), and (l) in the figure correspond to the case where a failure occurs wherein the detection value PTANK of the pressure sensor 11 varies continuously. In (e) and (i) in the figure, the solid line corresponds to the detection value PTANK, the center dashed line corresponds to the average value PTANKAVE, and the upper and lower dashed lines correspond to the average value PTANKAVE±predetermined value DLEAKCHK.

First, the case where the pressure sensor 11 is normal will be discussed. When the engine is in an idle state ((b) in FIG. 4) and the vehicle speed VSP ((a) in the figure) becomes 0 at time t1, the delay timer tm91BDLY ((c) in the figure) starts to down count. After the expiration of the predetermined delay time T91BDLY, a failure detection period TDET is started at time t2. When the value of the interval timer tmINTVAL ((d) in the figure) becomes 0 at time t3, the normality determination counter C91BOK ((h) in the figure) is incremented by one because the failure flag FKNG91B ((g) in the figure) is "0." Likewise, the normality determination counter C91BOK is also incremented by one at times t4 and t5, and the vehicle starts to run at time t6. Thus, the failure detection period TDET terminates and the value of the normality determination counter C91BOK is held. The vehicle stops at time t7, and the failure detection period TDET restarts at time t8 after the expiration of the predetermined delay time T91BDLY. The normality determination counter C91BOK is also incremented at times t9 and t10 and exceeds the determination threshold value 91BJVD at time t10, thus a normality determination (OK determination) is made. If the pressure sensor 11 is normal, the detection value PTANK moves up and down in the proximity of the average value PTANKAVE, thus the reversal flag FSPIKE ((f) in the figure) is set to "1" immediately if it is reset to "0" at time t3, t4, etc.

On the other hand, if the pressure sensor 11 fails, namely, its output varies continuously, the detection value PTANK exceeds the average value PTANKAVE±predetermined value DLEAKCHK ((i) in the figure) just after time t2, thus the failure flag FKNG91B ((k) in the figure) is set to "1." At time t21, the reversal flag FSPIKE ((j) in the figure) is set to "1," thus the failure determination counter C91BNG ((l) in the figure) is incremented by one at time t3. After time t3, the reversal flag FSPIKE is also set to "1" at times t31 and t41 and the failure flag FKNG91B is set to "1" (it is reset to "0" at time t3, but is set to "1" immediately in the example shown in the figure, thus it is shown in the figure that the flag holds "1." This also applies at times t4, t9, and t10). Thus, likewise, the failure determination counter C91BNG is also incremented at times t4 and t5 and holds the value after time t6. When the failure detection period TDET restarts at time t5, the failure determination counter C91BNG is also incremented at times t9 and t10 and exceeds the determination threshold value 91BJVD at time t10, thus it is determined that the pressure sensor fails.

As described above, in the embodiment, deviation determination as to whether or not the absolute value PCHK of the deviation between the detection value PTANK of the pressure sensor 11 and its average value PTANKAVE exceeds the predetermined value DLEAKCHK is executed repeatedly during the predetermined time TINTVAL. When the value of the failure determination counter C91BNG corresponding to the number of times the absolute value PCHK has been determined to exceed the predetermined value DLEAKCHK exceeds the determination threshold value 91BJVD, it is determined that the pressure sensor fails. Thus, a failure such that sensor output varies continuously as shown (i) in FIG. 4 can be detected accurately.

FIG. 5 is a timing chart to show the progress of the detection value PTANK of the pressure sensor 11 and its average value PTANKAVE at the refueling time. In the figure, refueling is executed between time t11 and time t12. As seen in the figure, a state in which the absolute value PCHK of the deviation between the detection value PTANK and the average value PTANKAVE is greater than the predetermined value DLEAKCHK continues for some time during or after refueling. Thus, if the failure determination counter C91BNG is incremented not on condition that the larger-than, equal-to, less-than relation between the detection value PTANK and the average value PTANKAVE is reversed (FSPIKE=1), the possibility that the pressure sensor may be erroneously determined to fail although it is normal is high. Then, in the embodiment, such an erroneous determination is prevented by incrementing the failure determination counter C91BNG on condition that the reversal flag FSPIKE is set to "1" within the predetermined time TINTVAL.

As the vehicle runs, fuel in the fuel tank shakes and the pressure sensor may be erroneously determined to fail although it is normal. This erroneous determination can be prevented because failure detection processing is performed while the vehicle stops (the vehicle speed VSP is 0).

If the relation between the detection value PTANK and the average value PTANKAVE as shown in FIG. 5 appears, it is possible that abrupt environmental change other than at the refueling time occurs.

In the embodiment, the ECU 5 forms the failure detection system; more particularly, the operation according to the above-mentioned expression (1) corresponds to average value calculation means and steps S19 to S25 in FIG. 2 and steps S31 to S39 in FIG. 3 correspond to failure determination means.

The scope of the invention is not limited to the above-described embodiment and various modifications may be made. For example, in the embodiment, the counts of the normality determination counter C91BOK and the failure determination counter C91BNG are held between the time t6 and the time t8 at which the failure detection period TDET restarts. However, when the failure detection period TDET terminates at the time t6, the counters may be both reset to "0."

What is claimed is:

1. A failure detection system used for an evaporation fuel processing unit which processes evaporation fuel occurring in a fuel tank, comprising:

a pressure sensor for detecting pressure in the fuel tank;

average value calculation means for calculating an average value of detected values of the pressure sensor;

deviation determination means for determining whether or not a deviation between the detected value and the average value is greater than a predetermined value; and failure detection means for detecting a state of failure of the pressure sensor by repeatedly executing the deviation determination means;

wherein the state of failure is determined if the number of times of the deviation of which value is greater than the predetermined value exceeds a predetermined number of times.

2. The failure detection system as claimed in claim 1 wherein said failure detection means executes the deviation determination means on a condition that the relative value of the detection value and the average value are reversed within a predetermined time.

3. The failure detection system as claimed in claim 1 or 2 wherein said failure detection means does not execute the deviation determination while a vehicle in which the fuel tank is installed is moving.

* * * * *